(12) United States Patent
Kerfoot

(10) Patent No.: US 7,033,492 B2
(45) Date of Patent: Apr. 25, 2006

(54) GROUNDWATER AND SUBSURFACE REMEDIATION

(76) Inventor: William B. Kerfoot, 49 Ransom Rd., Falmouth, MA (US) 02540

( * ) Notice: Subject to any disclaimer, the term of this patent is extended or adjusted under 35 U.S.C. 154(b) by 79 days.

(21) Appl. No.: 10/602,256

(22) Filed: Jun. 23, 2003

(65) Prior Publication Data
US 2004/0045911 A1    Mar. 11, 2004

Related U.S. Application Data

(62) Division of application No. 09/610,830, filed on Jul. 6, 2000, now Pat. No. 6,582,611.

(51) Int. Cl.
*E02B 1/00* (2006.01)
(52) U.S. Cl. ............... 210/170; 210/198.1; 405/128.75
(58) Field of Classification Search ................ 210/170, 210/198.1; 405/128.75
See application file for complete search history.

(56) References Cited

U.S. PATENT DOCUMENTS

| | | |
|---|---|---|
| 4,639,314 A | 1/1987 | Tyer |
| 4,696,739 A | 9/1987 | Pedneault |
| 4,966,717 A | 10/1990 | Kern |
| 5,116,163 A | 5/1992 | Bernhardt |
| 5,122,165 A | 6/1992 | Wang et al. |
| 5,180,503 A | 1/1993 | Gorelick et al. |
| 5,221,159 A | 6/1993 | Billings et al. |
| 5,227,184 A | 7/1993 | Hurst |
| 5,246,309 A | 9/1993 | Hobby |
| 5,277,518 A | 1/1994 | Billings et al. |
| 5,389,267 A | 2/1995 | Gorelick et al. |
| 5,425,598 A | 6/1995 | Pennington |
| 5,451,320 A | 9/1995 | Wang et al. |
| 5,472,294 A | 12/1995 | Billings et al. |
| 5,698,092 A | 12/1997 | Chen |
| 5,851,407 A | 12/1998 | Bowman et al. |
| 5,855,775 A | 1/1999 | Kerfoot |
| 5,879,108 A | 3/1999 | Haddad |
| 6,007,274 A | 12/1999 | Suthersan |
| 6,217,767 B1 | 4/2001 | Clark |
| 6,283,674 B1 | 9/2001 | Suthersan |
| 6,391,259 B1 | 5/2002 | Malkin et al. |
| 6,403,034 B1 | 6/2002 | Nelson et al. |

FOREIGN PATENT DOCUMENTS

| | | |
|---|---|---|
| JP | 4-171036 | 6/1992 |
| JP | 6-023378 | 2/1994 |

OTHER PUBLICATIONS

Reaction of Ozone with Ethene and Its Methyl- and Chlorine- Substituted Derivatives in Aqueous Solution, P. Dowideit, et al. Environmental Science & Technology, vol. 32, No. 8 pp. 1112-1119, (1998).

(Continued)

*Primary Examiner*—Betsey Morrison Hoey
(74) *Attorney, Agent, or Firm*—Fish & Richardson P.C.

(57) ABSTRACT

A method of treating a site containing contaminants and apparatus are described The method and apparatus sparges the site with an air/ozone gas stream delivered with a hydroperoxide, which is a substantial byproduct of a reaction of a contaminant present in the aquifer or soil formation with the ozone.

27 Claims, 5 Drawing Sheets

OTHER PUBLICATIONS

"Factors Controlling the Removal of Organic Pollutants in an Ozone Reactor", M.D. Gurol, AWWA 1984 Annual Conference, Dallas, TX, Jun. 10-14, 1984, pp. 2-21.

"In-situ Air Sparging Without Inorganic Nutrient Amendment: An Effective Bioremediation Strategy for Treating Petroleum-Contaminated Groundwater Systems", R. Schaffner, Jr., et al., http://www.bioremediationgroup.org/BioReferences/Tier1Papers/insitu.htm, Jul. 30, 2003, pp. 1-14.

"Environmental Management", DON Environmental Restoration Plan for Fiscal Years 1997-2001, Sep. 30, 1996, pp. 4-1 to 4-8.

"How to Evaluate Alternative Cleanup Technologies for Underground Storage Tank Sites", *U.S. Environmental Protection Agency*, Oct. 1994.

"Yuma Pilot-Testing Ozone Sparging, Stripping", *Pasha Publications, Defense Cleanup*, Nov. 8, 1996, pp. 5-6.

"Chemical Degradation of Aldicarb in Water Using Ozone", F.J. Beltran et al., *Journal of Chemical Technology & Biotechnology*, 1995, pp. 272-278.

"Modelling Industrial Wastewater Ozonation in Bubble Contactors", *Ozone Science & Engineering*, vol. 17, 1995, pp. 379-398.

"Modelling Industrial Wastewater Ozonation in Bubble Contactors", *Ozone Science & Engineering*, vol. 17, 1995, pp. 355-378.

"Kinetics of the Bentazone Herbicide Ozonation", *Journal of Environmental Science and Health*, vol. A31, No. 3, 1996, pp. 519-537.

"Field Applications of *In Situ* Remediation Technologies: Chemical Oxidation", *U.S. Environmental Protection Agency*, Sep. 1998, pp. 1-31.

"Technology Status Review In Situ Oxidation", *Environmental Security Technology Certification Program*, Nov. 1999, pp. 1-42.

Design of a Packed Bed Ozonation Reactor for Removal of Contaminants from Water, Billing, *Dissertation Abstracts International*, vol. 57, No. 10, Apr. 1997, pp. 6398-B.

"Completed North American Innovative Remediation Technology Demonstration Projects", *U.S. Environmental Protection Agency, Office of Solid Waste and Emergency Response*, Aug. 12, 1996, pp. 1-35.

"Ground Water Issue", H.H. Russell et al., *U.S. Environmental Protection Agency*, Jan. 1992, pp. 1-10.

"*In Situ* Chemical Treatment", Y. Yin, Ph.D., *Technology Evaluation Report, GWRTAC*, Jul. 1999, pp. 1-74.

"Analysis of Selected Enhancements for Soil Vapor Extraction", U.S. Environmental Protection Agency, Sep. 1997, pp. 1-5 to 7-39.

Biologisch-chemische Behandlung Eines Kontaminierten Grundwassers von einem Gaswerksgelande, Dr.-Ing. Joachim Behrendt, *Technische Universitat Hamburg-Harburg, Germany*, vol. 136, No. 1, Jan. 1995, pp. 18-24.

"Single-phase Membrane Ozonation of Hazardous Organic Compounds in Aqueous Streams", P.V. Shanbhag et al., *Journal of Hazardous Materials* 41, 1995, pp. 95-104.

Gas Partitioning of Dissolved Volatile Organic Compounds in the Vadose Zone: Principles, Temperature Effects and Literature Review, J.W. Washington, GROUNDWATER, vol. 34, No. 4, Jul.-Aug. 1996, pp. 709-718.

"Biologically Resistant Contaminants, Primary Treatment with Ozone", D.F. Echegaray et al., *Water Science and Technology, A Journal of the International Association on Water Quality*, vol. 29, No. 8, 1994, pp. 257-261.

"Toxins, toxins everywhere", K.K. Wiegner, *Forbes*, Jul. 22, 1991, pp. 298.

"In Situ Air Sparging System", *Tech Data Sheet, Naval Facilities Engineering Service Center*, Mar. 1997, pp. 1-4.

"Ground Water, Surface Water, and Leachate", http://www.frtr.gov/matrix2/section_4/4-30.html, Jul. 22, 2003, pp. 1-4.

"Alternate Technologies for Wastewater Treatment", J. Hauck et al., *Pollution Engineering*, May 1990, pp. 81-84.

"Cleaning up", *Forbes*, Jun. 1, 1987, pp. 52-53.

"*In Situ* Chemical Oxidation for Remediation of Contaminated Soil and Ground Water", *EPA*, Sep. 2000, Issue No. 37, pp. 1-6.

"Aquifer Remediation Wells", *EPA*, vol. 16, Sep. 1999, pp. 1-80.

"Transfer Rate of Ozone across the Gas-Water Interface", S. Okouchi et al., The Chemical Society of Japan, No. 2, 1989, pp. 282-287.

"Effect of Organic Substances on Mass Transfer in Bubble Aeration", M. Gurol et al., *Journal WPCF*, vol. 57, No. 3, pp. 235-240.

"Clare Water Supply", *EPA*, http://www.epa.gov/region5/superfund/npl/michigan/MID980002273.htm, pp. 1-3.

"Who's Afraid of MTBE?", K.P. Wheeler et al., *Manko, Gold & Katcher*, http://www.rcc-net.com/Wheels.htm, Jul. 2000, pp. 1-5.

"RCC RemedOzone Mobile Remediation System", RCC.

"Santa Barbara I Manufactured Gas Plant Site", *California EPA*, Jan. 2002, pp. 1-6.

"Typical Applications of Ozone", ARCE Systems, Inc., http://www.arcesystems.com/products/ozone/applications.htm, Feb. 2000, pp. 1-2.

"Strategies to Protect Your Water Supply from MTBE", Komex Industries, http://www.komex.com/industries/remediation.stm, 2002, pp. 1-8.

"In Situ Remediation with Chemical Oxidizers: Ozone, Peroxide and Permanganate", Environmental Bio-systems, Inc., pp. 1-5.

"Newark Brownfield Site to Increase Student Housing", Environmental Alliance Monitor, http://www.envalliance.com/monitor&pubs/1998fall.htm, 1998, pp. 1-8.

"*In Situ* Ozonation to Remediate Recalcitrant Organic Contamination", J. Dablow et al., IT Corporation, pp. 1-2.

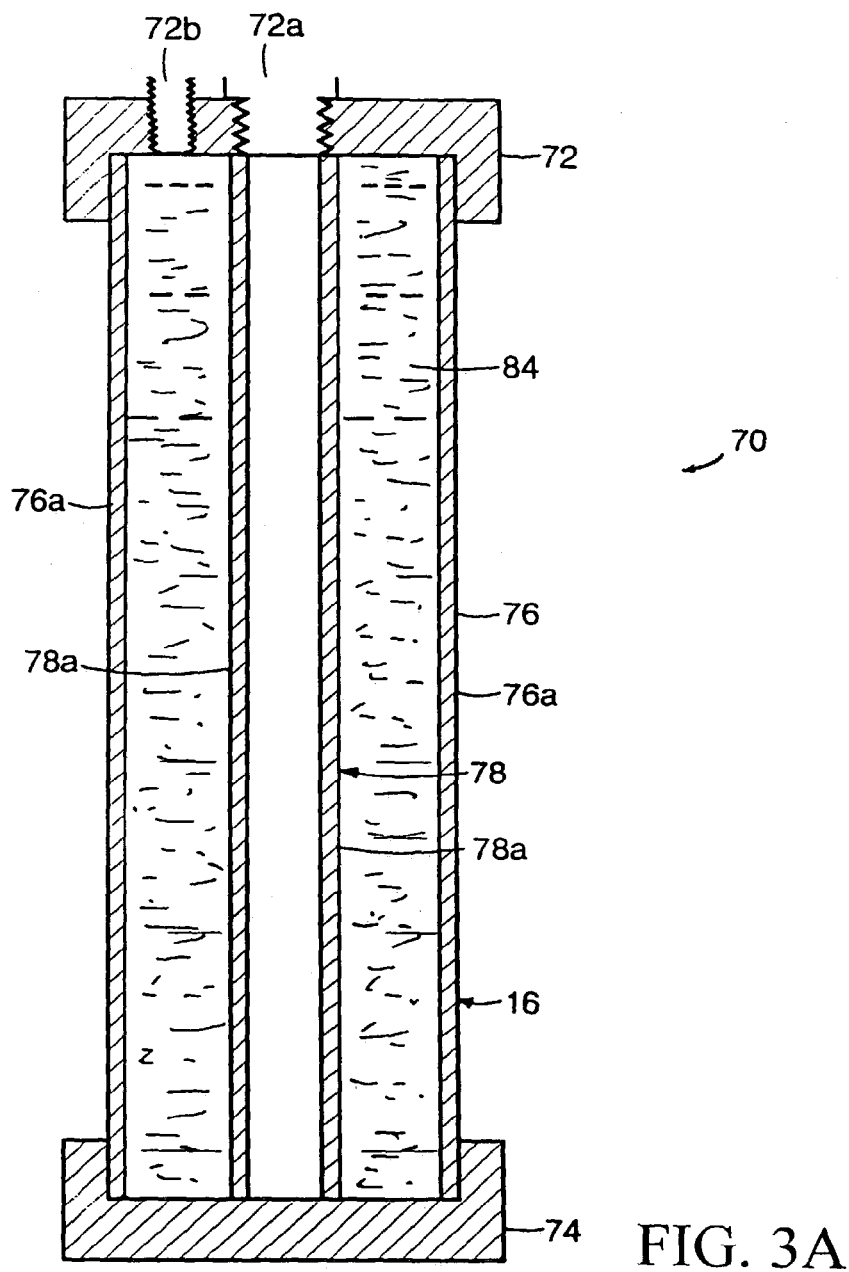
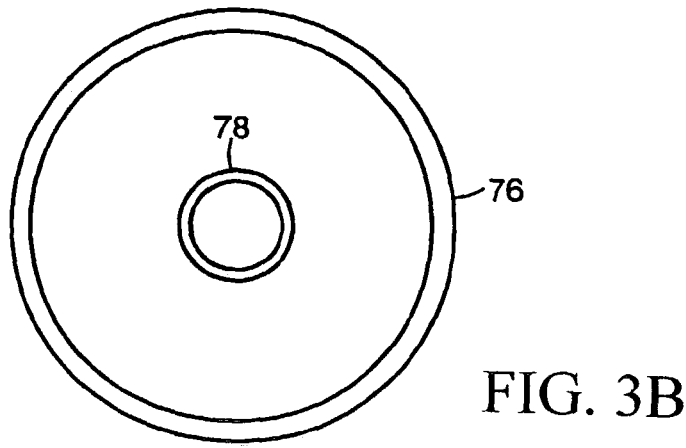
FIG. 3A
FIG. 3B

GROUNDWATER AND SUBSURFACE REMEDIATION

This application is a divisional (and claims the benefit of priority under 35 USC 120) of U.S. application Ser. No. 09/610,830, filed Jul. 6, 2000 now U.S. Pat. No. 6,582,611.

BACKGROUND

This invention relates generally to groundwater and subsurface soil remediation.

There is a well recognized need for removal of subsurface contaminants that exist in aquifers and surrounding soils. Such contaminants can include various man-made volatile hydrocarbons including chlorinated hydrocarbons, e.g., volatile organic compounds such as chlorinated olefins including tetrachloroethylene, trichloroethylene, cis 1,2-dichloroethane and vinyl chloride. Other compounds include aromatic or polyaromatic ring compounds such as benzene, toluene, methylbenzene, xylenes, naphthalene, and propellents or explosives such as nitro anilines trinitrotoluene, and so forth. The groups of compounds are characterized by aromatic ring structures also include alkyl substituted aromatic hydrocarbons.

SUMMARY

According to an aspect of the present invention, a method of treating a site includes sparging the site with an air/ozone gas stream delivered with a hydroperoxide, which is a substantial byproduct of a reaction of a contaminant present in the aquifer or soil formation with the ozone.

The air/ozone gas stream is delivered through a microporous diffuser that delivers the air/ozone gas in microbubbles. In some embodiments, the hydroperoxide is selected from the group consisting of formic peracid, hydroxymethyl hydroperoxide, 1-hydroxylethyl hydroperoxide, and chloroformic peracid or their derivatives. The hydroperoxide is selected based on the type of contaminant present in the site. The hydroperoxide is delivered as a surface layer over microfine bubbles including the air/ozone gas. Sparging introduces air including the oxidizing gas into the microporous diffuser. The microporous diffuser also introduces promoters or nutrients such as catalyst agents including iron containing compounds such as iron silicates or palladium containing compounds such as palladized carbon and platinum or platinum containing compounds.

According to an additional aspect of the invention, an apparatus for treating subsurface water includes a well having a casing with an inlet screen and outlet screen to promote recirculation of water into the casing and through surrounding ground area and at least one microporous diffuser disposed in the injection well that allows delivery of a pair of fluids with one of the fluids forming a coating over the other of the fluids. The apparatus also includes an ozone generator, an air compressor and compressor/pump control mechanism to deliver ozone ($O_3$) from the ozone generator to the microporous diffuser, and a source of the liquid hydroperoxides selected from the group consisting of formic peracid, hydroxymethyl hydroperoxide, 1-hydroxylethyl hydroperoxide, and chloroformic peracid or their derivatives. The apparatus includes a pump to deliver the selected liquid hydroperoxide to the microporous diffuser.

One or more of the following advantages may be provided by one or more aspects of the invention.

The hydroperoxides promote decomposition of chlorinate olefins by forming a secondary liquid-phase reactive interface to the contaminants such as volatile chlorinate olefins and volatile hydrocarbons including chlorinated hydrocarbons, chlorinated olefins such as tetrachloroethylene, trichloroethylene, cis 1,2-dichloroethane and vinyl chloride and other compounds e.g., aromatic ring compounds, propellants, explosives, and so forth that are found as contaminants compounds as the contaminants enter the gaseous phase within the bubbles.

Promoters or nutrients are introduced with the hydroperoxides. The hydroperoxides are produced by reactions that decompose the contaminants. In the presence of the hydroperoxides, the promoters or nutrients can combine with the hydroperoxides and promote and accelerate the decomposition reactions. Further, when treating contaminants that have large number of double bonded carbon atoms or which are present in super-saturated conditions the addition of the hydroperoxides promotes rapid and efficient Criegee reactions of the contaminants.

BRIEF DESCRIPTION OF THE DRAWINGS

FIGS. 2A–3A and 2B–3B are respectively longitudinal cross-sectional and plan cross-sectional views of a microporous diffuser useful in the arrangement of FIG. 1.

DETAILED DESCRIPTION

Figure 1A:
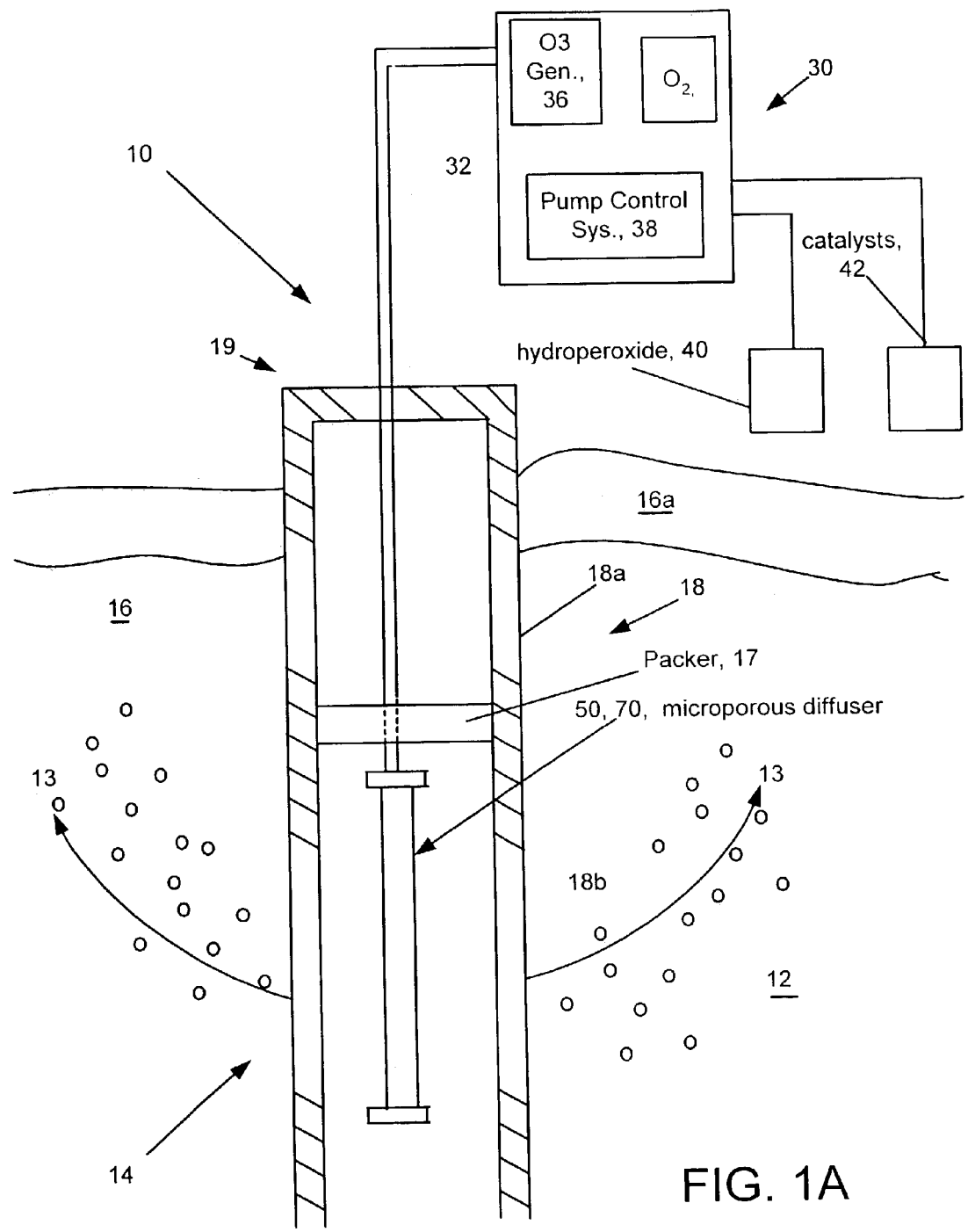
FIGS. 1A–1B are cross-sectional views showing soil formations and underlying aquifers with two embodiments of sparging apparatus.

Referring to FIG. 1A, an arrangement of a treatment system 10 to treat contaminants in a subsurface aquifer 12 includes an sparging apparatus 14 that is disposed through a soil formation 16. In this arrangement, the sparging apparatus is disposed through a vadose zone 16a and the underlying aquifer 12. The sparging apparatus 14 includes a casing 18 that is positioned through a bore hole 19 disposed through the soil formation 16. The casing 18 has an inlet screen 18a disposed on an upper portion thereof and an outlet screen 18b disposed on a bottom portion thereof. Disposed through the casing 18 is a microporous diffuser 50 (FIGS. 2A, 2B) or 70 (FIGS. 3A, 3B), as will be described below. Also disposed in the casing is a packer 17 that isolates the upper screen 18a from the lower screen 18b and appropriate piping to connect sources of decontamination agents to the microporous diffuser 50, 70. When fluid is injected through the microporous diffuser 50, 70 the packer 17 and screens 18a, 18b enable a re-circulation water pattern 13 to evolved about the sparging apparatus 14.

The arrangement 10 also includes a treatment control system 30 including an air compressor 32, e.g., pump that feeds a mixture of air/ozone into the microporous diffusers 50, 70. The air compressor 32 delivers air mixed with ozone ($O_3$) that is produced from an ozone generator 36 into the microporous diffusers. The mixture of air/ozone affects substantial removal of contaminants such as various man-made volatile hydrocarbons including chlorinated hydrocarbons, chlorinated olefins such as tetrachloroethylene, trichloroethylene, cis 1,2-dichloroethane and vinyl chloride and other compounds e.g., aromatic ring compounds, propellants, explosives, and so forth that are found as contaminants.

The treatment system 10 also includes a delivery mechanism e.g., a second pump 38 or other feed arrangement that supplies a liquid decontamination agent such as hydrogen peroxide or other hydroperoxides into the microporous diffuser 50, 70. The hydrogen peroxide or other hydroperoxides are provided via a source 40. Also supplied to the microporous diffusers are promoters or nutrients, as well as catalyst agents 42 including-iron containing compounds such as iron silicates, ferrous iron, acetic acid, or palladium containing compounds such as palladized carbon or other transition metals in acid solution. In addition, other materials such as platinum may alternatively be used. The promoters or nutrients are introduced with the hydroperoxides. The hydroperoxides are produced by reactions that decompose the contaminants. In the presence of the hydroperoxides, the promoters or nutrients can combine with the hydroperoxides and promote and accelerate the decomposition reactions.

Figure 1B:
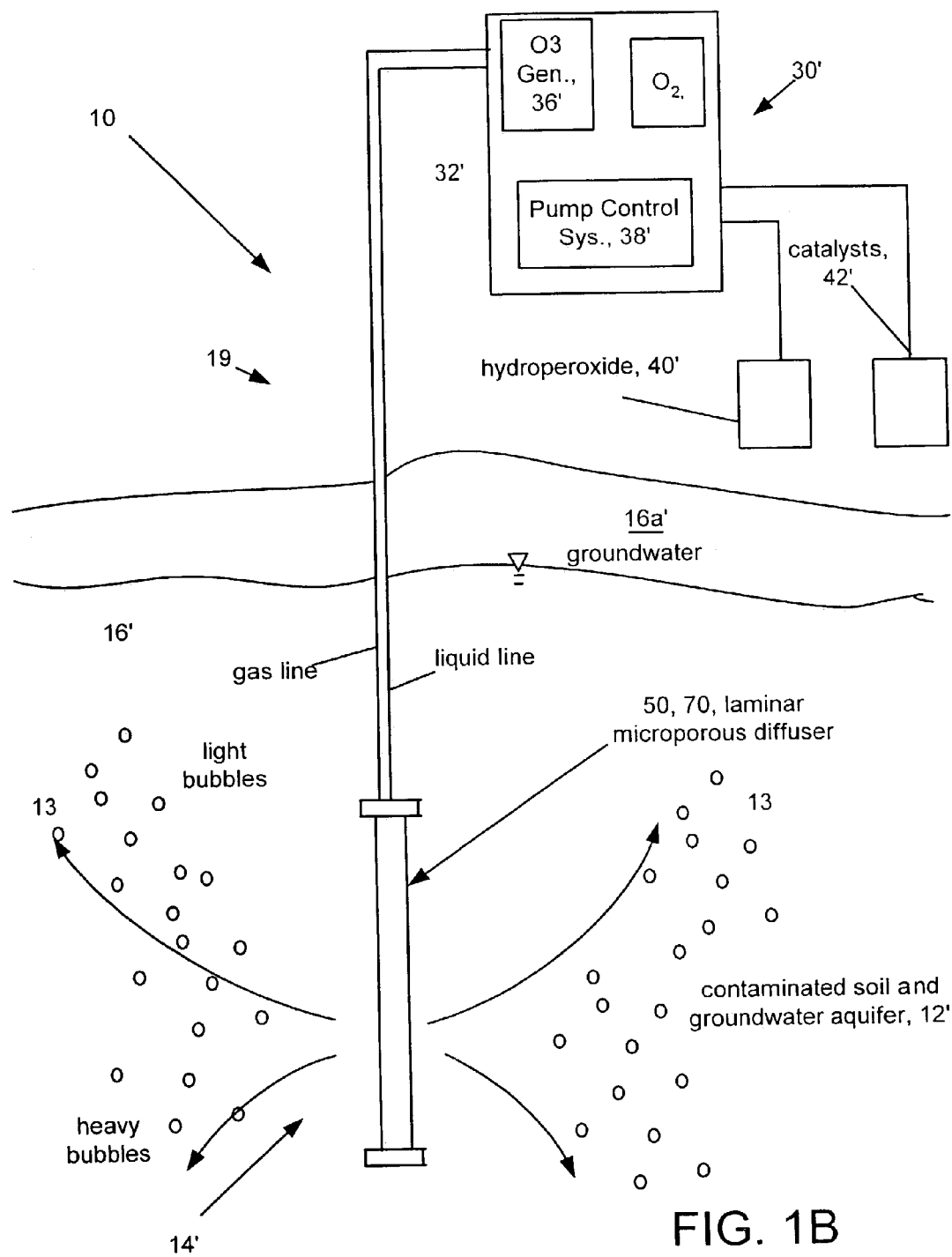

Referring to FIG. 1B an alternate embodiment of a treatment system 10' is shown. The treatment system 10' treats contaminants in a subsurface aquifer 12' includes an sparging apparatus 14' that is disposed through a soil formation 16'. In this arrangement, the sparging apparatus is disposed through a vadose zone 16a' and the underlying aquifer 12'. The sparging apparatus 14 includes a microporous diffuser 50 (FIGS. 2A, 2B) or 70 (FIGS. 3A, 3B), as will be described below. The microporous diffuser is positioned through a bore hole 19 disposed through the soil formation 16 or alternatively can be of the type that is injected into the soil formation. The microporous diffuser is coupled to appropriate piping to connect sources of decontamination agents to the microporous diffuser 50, 70. When fluid is injected through the microporous diffuser 50, 70, the microporous diffusers enables a water pattern 13' to evolved about diffuser. Light bubbles tend to travel upwards whereas heavier bubbles tend to travel downwards.

The arrangement 10' also includes a treatment control system 30' generally similar to system 30' (FIG. 1A) including an air compressor 32' that feeds a mixture of air/ozone into the microporous diffusers 50, 70. The air compressor 32' delivers air mixed with ozone ($O_3$) that is produced from an ozone generator 36 into the microporous diffusers. The treatment system 10' also includes a second pump 38' that supplies a liquid decontamination agent such as hydrogen peroxide or other hydroperoxides into the microporous diffuser 50, 70. The hydrogen peroxide or other hydroperoxides are provided via a source 40'. Also supplied to the microporous diffusers are promoters or nutrients, as well as catalyst agents 42' as also mentioned above.

The treatment system 10 or system 10' makes use of a gas-gas reaction of contaminant vapors with ozone, as will be described below, supplemented by a liquid phase reaction provided by a flow of hydrogen peroxide and preferable other hydroperoxides, described below. The ozone is trapped inside of micro bubbles produced from the air/ozone escaping the microporous diffusers 50, 70 and being trapped in water from the aquifer. On the other hand, hydrogen peroxide or other hydroperoxides provide a thin film coating over the outer surfaces of the bubbles.

The hydroperoxides promote decomposition of chlorinate olefins by forming a secondary liquid-phase reactive interface to the contaminants such as volatile chlorinate olefins and volatile hydrocarbons including chlorinated hydrocarbons, chlorinated olefins such as tetrachloroethylene, trichloro-ethyl-ene, cis 1,2-dichloroethane and vinyl chloride and other compounds e.g., aromatic ring compounds, propellants, explosives, and so forth that are found as contaminants compounds as the contaminants enter the gaseous phase within the bubbles. Suitable hydroperoxides can be as these listed in Table 1.

TABLE 1

| Structure | Name | Allen's Reagent Rate Reaction Constant |
|---|---|---|
| HCOOOH | Formic Peracid | 218 |
| $H_2O_2$ | Hydrogen peroxide | 0.27 |
| $HOCH_2OOH$ | Hydroxymethyl Hydroperoxide | $3.4 \times 10^{-3}$ |
| $CH_3CH(OH)OOH$ | 1-Hydroxylethyl Hydroperoxide | $5 \times 10^{-2}$ |
| $(CH_3)_2C(OH)OOH$ | Chloroformic Peracid | $\sim 2 \times 10^{-5}$ |

These hydroperoxides or derivatives thereof react at different rates with the olefins, as shown for the Allen's Reaction Rate Constants in Table 1. The presence of the hydroperoxides as a coating over the gas bubbles contact contaminants such as compounds containing aromatic rings to break the rings into fragments that partition from liquid to gas phase bringing them more rapidly into contact with the gaseous ozone within the microfine bubbles. The presence of iron of a transition metal e.g., nickel or tin, or platinum or palladium solution can assist the reaction by becoming electron donors or act as catalyst agents.

In general, the hydroperoxides are intermediary compounds that are produced from a reaction of ozone, with particular olefins. Thus, for other olefins the appropriate hydroperoxide would be the intermediary hydroperoxide-that results from the reaction of the olefin with ozone.

While ozone in high concentration is recognized as an agent for rapid decomposition of semi-volatile or poorly volatile polyaromatic ring compounds in soil, the combination of a slowly reacting hydroperoxides and ozone provides improved efficiency of-delivery and reaction. This results since the gaseous partitioning pulls compounds through the hydroperoxide interface reducing extraneous secondary reactions that occur with soil components as observed when hydrogen peroxide is injected as a solution into fractured soil formations, as in so called Fenton's agent reactions.

As mentioned above, these hydroperoxides formic peracid, hydrogen peroxide, hydroxymethyl hydroperoxide, 1-hydroxymethyl hydroperoxide, and chloroformic peracid, are intermediary products in reactions involving chlorinated olefins and ozone. As by-products of reactions of the chlorinated olefins with ozone the presence of the hydroperoxides as a coating on the bubbles serves to mitigate other competing reactions that can occur when the chlorinated olefins double bonded carbon atoms are attacked by the ozone as the chlorinated olefins enter the bubbles.

The coating on the bubbles provided by the microporous diffusers 50, 70 can be consider to be a gas-liquid-emulsion since the micro bubbles are dispersed gases with film coatings. Rather than a foam, the material co-exists in liquid water and does not necessarily rise to the top surface. Moreover, the hydroperoxide coating is not technically in solution with the gas. A solution would have the ozone gas and hydroperoxide liquid dispersed homogeneously without chemical change. In this arrangement, the coating on the bubbles exist separate from the gas inside the bubbles.

Figure 2A:
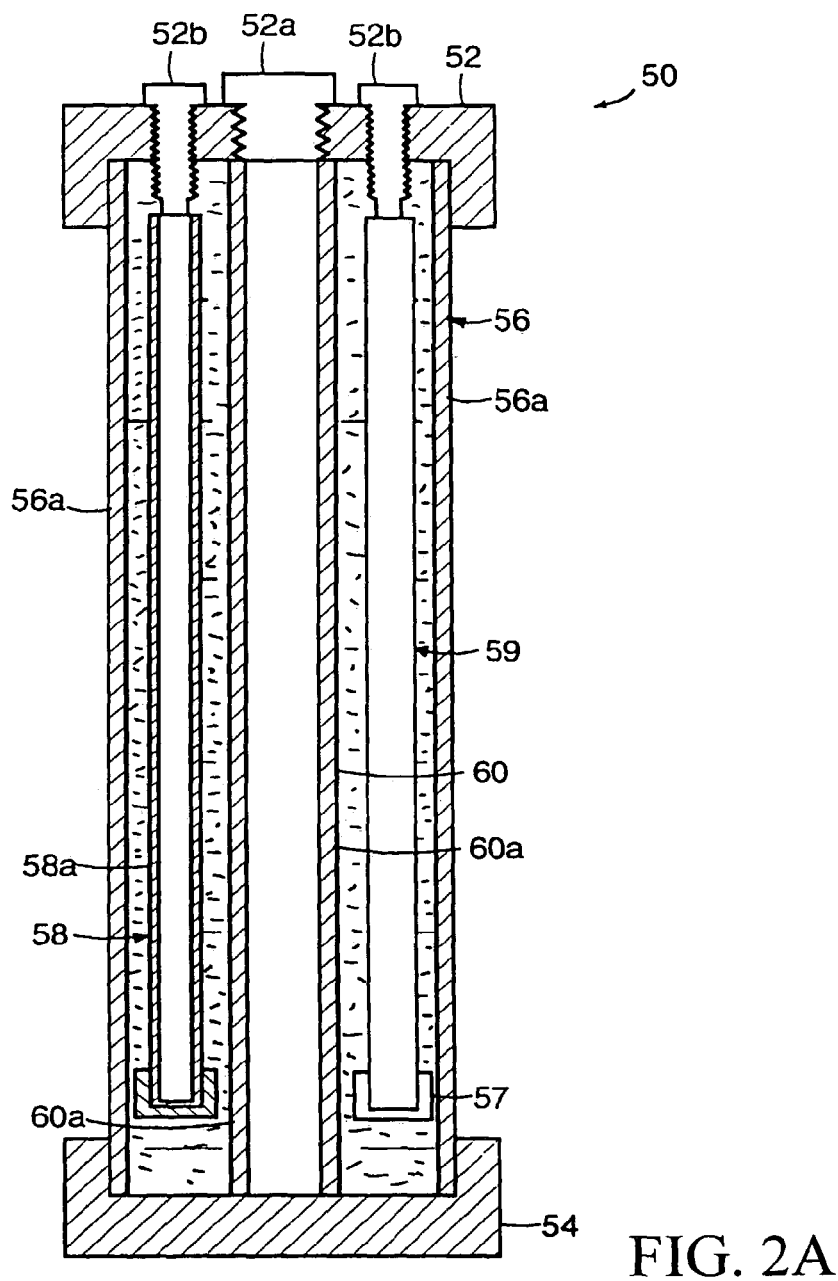
Figure 2B:
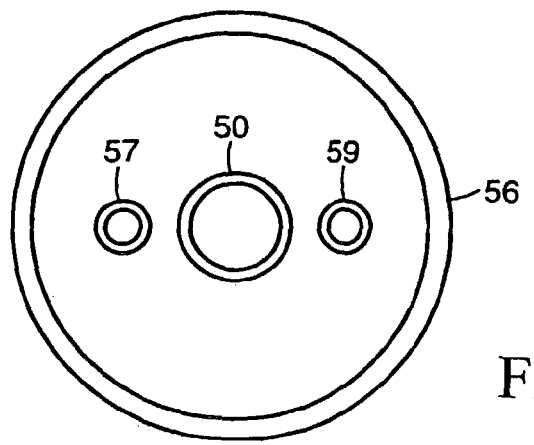
Figure 4:
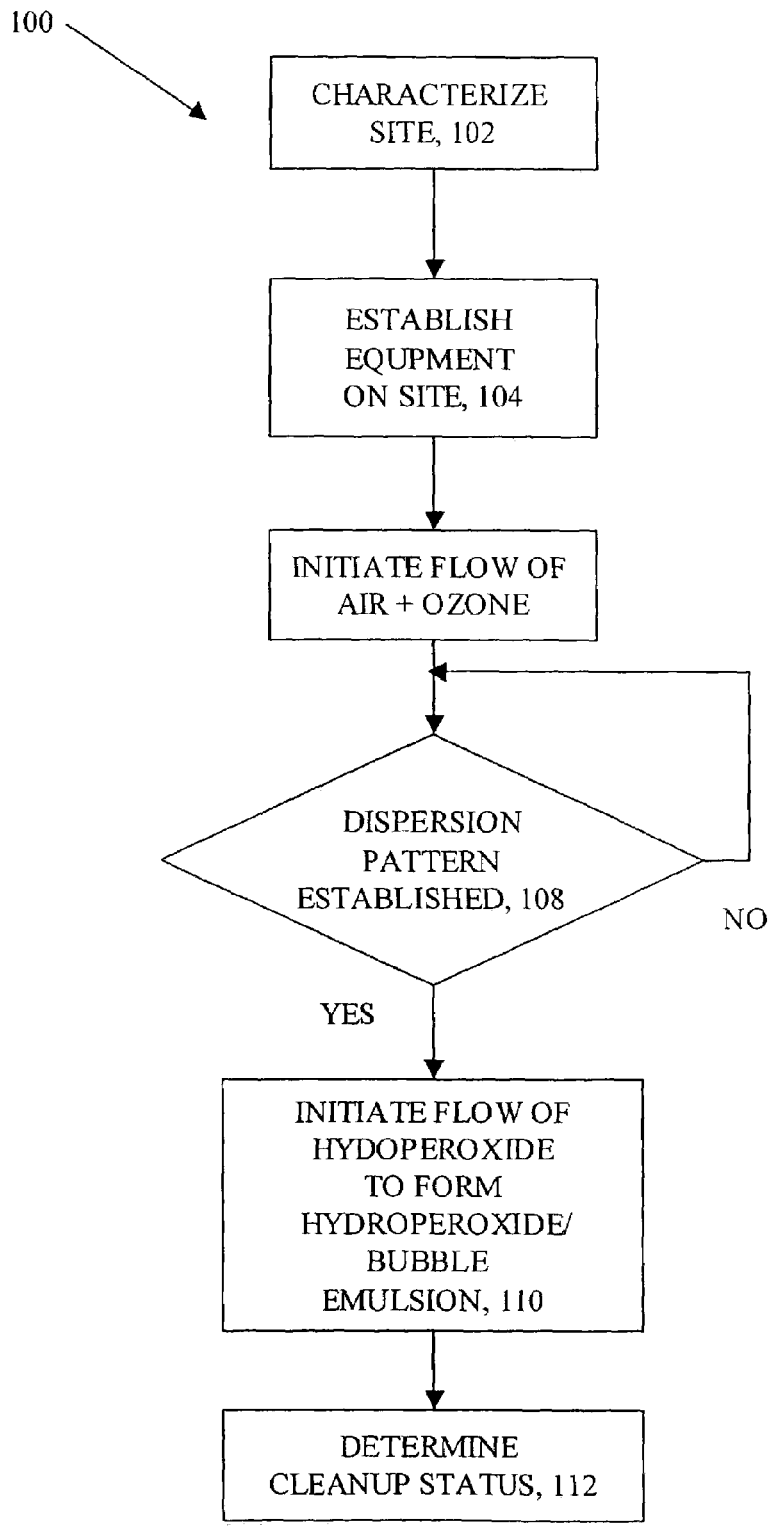
FIG. 4 is a flow chart of a process flow using the system of FIG. 1A or FIG. 1B.

Referring now to FIGS. 2A–2B, a first embodiment of a microporous diffuser 50 is shown. The microporous diffuser 50 includes a first cylindrical member 56 comprised of a hydrophobic material that provides an outer cylindrical shell for the microporous diffuser 50. The cylindrical member 56 has a sidewall 56a that is comprised of a large plurality of micropores. A second cylindrical member 60 is coaxially disposed within the first cylindrical member 56. The second cylindrical member 60 is comprised of a hydrophobic material e.g., high density polyethylene or polyvinyl chloride etc. and has a sidewall 60a that is comprised of a large plurality of micropores. Also disposed within the confines of the first microcylinder 60 are a plurality of cylindrical members 58, here that have sidewalls 58a having a large plurality of micropores and also comprised of a hydrophobic material.

A proximate end of cylindrical member 60 is coupled to a first inlet port provided from a first inlet cap 52 and proximate ends of the plurality of cylindrical members 58 are coupled to second inlet ports generally denoted as 52b. At the opposite end of the microporous diffuser 50 is an end cap 54 that covers distal ends of cylindrical members 56 and 58. Here distal ends of the plurality of cylindrical members are sealed by separate caps 59 but could be terminated by a common end cap as the end cap 54. The end cap 54, in conjunction with cap 52, seals ends of the microporous diffuser 50.

The cylindrical members 56, 58 and 60 are cylindrical in shape and have a plurality of microporous openings constructed through sidewalls 56a, 58a and 60a, respectively thereof, having pore sizes matched to a porosity characteristic of the surrounding formation to produce a pore size effective for inducing gas-gas reactions in bubbles that emanate from the microporous diffusers into the surrounding soil formations and/or aquifer. The sidewalls can have pore diameters in a range of 1–200 microns, preferably 1 to 50 microns or more preferably 5 to 20 microns.

The combination of the inlet cap and the end cap seals the microporous diffuser 50 permitting liquid and gas to escape by the porous construction of sidewalls of the microporous diffusers. The microporous diffuser can be filled with a microporous material such as microbeads having mesh sizes from 20 to 200 mesh, or sand pack, or porous hydrophilic plastic to allow introducing a liquid into the porous spaces. In this arrangement, the liquid is one of the aforementioned hydroperoxides formic peracid, hydrogen peroxide, hydroxymethyl hydroperoxide, 1-hydroxymethyl hydroperoxide, and chloroformic peracid or derivatives, and so forth.

Referring now to FIGS. 3A and 3B, an alternative embodiment 70 of the microporous diffuser is shown. The microporous diffuser 70 includes an outer cylindrical member 76 having a sidewall 76a within which is disposed an inner cylindrical member 78 having a sidewall 78a. The inner cylindrical member 78 is spaced from the sidewall of the outer cylindrical member by a space 77. The space 77 between the inner and outer cylindrical members 76, 78 is filled with a packing material comprised of glass beads or silica particles (silicon dioxide) or porous plastic which is, in general, hydrophilic in nature. The space is coupled to an input port 72 that receives a liquid and catalyst and/or promoters or nutrients from pump 39 (FIG. 2). The microporous diffuser has the inner cylindrical member 78 disposed coaxial or concentric to cylindrical member 78.

Sidewalls of each of the cylindrical members can have a pore diameter in the range of 1 to 200 microns. Depending on soil conditions various ranges can be used exemplary ranges are 50 to 200 microns for very coarse gravel-like soils, 1 to 50 microns for sandy-type soils or 1–5 to 20 microns for more silty type soils. A proximate end of the cylindrical member is coupled to an inlet port 72a that is fed an air-ozone mixture from pump 36. The microporous diffuser also includes an end cap 74 which secures distal ends of a cylinder 76, 78. The combination of the inlet cap 72 and end cap 78 seals the microporous diffuser permitting liquid and gas to escape by the porous combination of construction of the sidewalls of the microporous diffusers. Also in this arrangement, the liquid is one of the aforementioned hydroperoxides, e.g., formic peracid, hydrogen peroxide, hydroxymethyl hydroperoxide, 1-hydroxymethyl hydroperoxide, and chloroformic peracid, etc.

Thus, when using the microporous diffusers 50 or 70 in the arrangement of FIG. 1, an air-ozone mixture is injected through port 52a, 72a (microporous diffusers 50, 70, respectively) and produces bubbles of the diameters according to the pore size of the sidewalls of the cylinder. Liquid hydroperoxides e.g., formic peracid, hydrogen peroxide, hydroxymethyl hydroperoxide, 1-hydroxymethyl hydroperoxide, and chloroformic peracid etc., as set forth in Table 1 is introduced into the microporous diffusers 50 and 70 via inlet ports 52b and microporous diffuser 50 or inlet port 72b and microporous diffuser 70. The presence of liquid in the microporous diffusers will coat microbubbles that emerge from the central portions of the microporous diffusers providing the liquid-gas emulsion referred to above. This liquid-gas emulsion exits the microporous diffusers 50, 70 and travels through the surrounding soil formation and aquifer.

The Criegee reaction of ozone in a water gas mixture is promoted by the microbubble emulsion. The hydroperoxide compounds and ozone produce reactions during the process of water to gas partitioning with volatile organic compounds or absorbed liquid/water to gas partitioning with semi-volatile organic compounds. The breakdown of chlorinated or halogenated solvents in an aqueous solution by Criege decomposition involving ozone yields various hydroperoxide products such as those set forth in Table 1. To promote higher concentration of volatile organic and semi-volatile organic destruction, the organic hydroperoxides are injected with the laminated microporous diffusers 50, 70 as a coating for the microporous emulsions. The injection which occurs under pressure produces an aerosol in the system 10 where water is reduced to particles of micron size. Therefore to practice the methods described below, any system that can produce an aerosol of the hydroperoxide coated bubbles may be used.

The peroxide acid solution becomes a coating of a micro-size bubble occupying a fifth or less of the volume of the gas injected. It is believed that at this point, the coating is not in solution with the water or ozone. As used a solution can be considered as a gas, liquid or solid dispersed homogeneously in a gas, liquid or solid without chemical change. Rather, the hydroperoxide/water/ozone is a gas-liquid emulsion as referred to above. Attaching to the surface of a semi-volatile compound such as an olefin e.g., nitroaniline or nitrotoluene or polyaromatic ring compounds the coating reacts with the aromatic rings of such compounds to break the rings into fragments that partition from a liquid to gas phase bringing them even more rapidly into contact with the gaseous ozone content.

Referring to FIG. 4, a process 100 using the arrangement 10 of FIG. 1 for treating groundwater and surface waters includes characterizing 102 a site. Characterizing the site includes determining the porosity characteristics of surrounding soil formations, depth to aquifers, thickness of aquifers, the hydraulic conductivity of the aquifer, and the nature and extent of contaminants, e.g., types and concentrations in aqueous solution and in the soils. After the site has been characterized, equipment of the arrangement shown in FIG. 1 or an equivalent arrangement are established 104 on the site. The equipment established 104 can be comprised of a large plurality of apparatuses of the type shown in FIG. 1 disposed in a corresponding plurality of-wells provided on the site in accordance with the volume of subsurface soils and water that the apparatus can treat. Many different configurations of the equipment can be used such as placing multiple microporous diffusers 50, 70 into a single well or using one or more of the microporous diffusers in combination with microporous well screens and packers to produce a bubble chamber and so forth. Typically, an apparatus having single laminar point and double well screens can cover a radii of 30 ft. and 60 ft., respectively for 15–20 ft. thick aquifers.

Once the equipment has been established on a site, the process 100 initiates 106 a flow of air and ozone ($O_3$) through the microporous diffusers 50, 70. In response, the process 100 produces microbubbles of appropriate size determine in accordance with the porosity characteristics of the microporous diffusers that attempt to match that of the surrounding soil formation. As described above, generally this porosity characteristic is in a range of 5 to 200 microns. Other ranges may be used however. The flow of air and ozone continues through the microporous diffusers 50, 70 and produces a dispersed pattern of microfine bubbles through the treatment area. During the process 100, the wells are monitored 108 to determine when a microfine bubble pattern of appropriate dispersion through the treatment zone has been established. Bubble dispersion can be determined by dissolved oxygen distribution, oxidative reduction potential measurements, or by direct measurement of microbubbles (bubble counters). Once this pattern has been established the process initiates 110 a flow of a suitable hydroperoxide(s) selected in accordance with the contaminant(s) being treated. The hydroperoxides are in the form of liquid that is provided in the outer portions of the microporous diffusers 50, 70. Initiation 110 of the flow of hydroperoxides allows the hydroperoxides to coat the microbubbles as they emerge from the center of the microporous diffusers 50, 70 producing the above-mentioned hydroperoxide bubble emulsion. The process periodically samples 112 groundwater to determine the cleanup status of the site. Once contaminants in the groundwater have reached a certain level, the process 100 can be terminated. Alternatively, the process can be used as a fence to continually and indefinitely pump air-ozone and a suitable hydroperoxide into a portion of a contaminated site to contain a migrating plume of contaminants from reaching a critical area such as residential wells, aquifers and so forth.

Typical conditions for the air/ozone flow are as follows:

| Unit | Air | Ozone gm/day | hydro-peroxide gal/day | recirculation wells | laminar microporous diffuser |
|---|---|---|---|---|---|
| wall mount | 3–5 CFM | 144–430 | 5–50 | 1–4 | 1–8 |
| pallettized | 10–20 CFM | 300–1000 | 20–200 | 1–8 | 1–16 |

The percent concentration of hydroperoxide in water is typically in a range of (2–20) percent although other concentrations can be used. The flow is adjusted to the total mass of the contaminants in the soil and water. If high concentrations (greater than 50,000 parts per billion in water or 500 mg/kg in soil) of the contaminants are present sufficient hydroperoxides should be added in insure efficient decomposition by the Criegee reaction mechanism. Preferably this would occur in the presence of an accelerant (e.g., transition metals iron, nickel or zinc, and/or catalysts palladium or platinum).

Further, when treating contaminants that have large number of double bonded carbon atoms or which are present in super-saturated concentrations e.g., (greater than 200,000 parts per billion in water or 5000 mg/kg in soil) the addition of the hydroperoxides is highly desirable to promote rapid and efficient Criegee reactions on the site. This is because, the mole volume or ratio of moles of the contaminant to moles of ozone becomes high in the presence large number of double bonded carbon atoms or high concentrations, while the concentration of the ozone is limited to that which can be suitable injected taking into consideration generation capacity, stress on the apparatus, site conditions and desire to maintain a Criegee mechanism.

Other embodiments are within the scope of the appended claims.

What is claimed is:

1. An apparatus for treating subsurface water comprises:
    a well having a casing with an inlet screen and outlet screen to promote a recirculation of water into the casing and through surrounding ground area,
    at least one microporous diffuser disposed in the injection well that allows delivery of first and second fluids with one of the fluids forming a coating over the other one of the fluids;
    an ozone generator;
    an air compressor and compressor/pump control mechanism to deliver ozone (O3) from the ozone generator to the microporous diffuser as one of the fluids;
    a source of the liquid hydroperoxides selected from the group consisting of formic peracid, hydroxymethyl hydroperoxide, 1-hydroxylethyl hydroperoxide, and chloroformic peracid or their derivatives; and
    a feed mechanism to deliver the selected liquid hydroperoxide to the microporous diffuser as the second one of the fluids.

2. The apparatus of claim 1 wherein the feed mechanism is a pump.

3. The apparatus of claim 1 wherein the microporous diffuser comprises a central inner chamber and an outer chamber and the apparatus is configured to deliver air with the ozone to the central inner chamber of the microporous diffuser and the liquid hydroperoxide to the outer chamber of the microporous diffuser.

4. The apparatus of claim 1 wherein the microporous diffuser has a porosity characteristic that permits bubbles of 5–200 microns diameter to be released into the surrounding formation.

5. The apparatus of claim 1 wherein the microporous diffuser has a porosity characteristic that permits bubbles in a range of 50 to 200 microns to be released into the surrounding formation.

6. The apparatus of claim 1 wherein the microporous diffuser has a porosity characteristic that permits bubbles in a range of 1 to 50 microns to be released into the surrounding formation.

7. The apparatus of claim 1 wherein the microporous diffuser has a porosity characteristic that permits bubbles in a range of 1 to 20 microns to be released into the surrounding formation.

8. The apparatus of claim 1 wherein the apparatus is configured to deliver peroxide acid as a coating over microbubbles that emanate from the microporous diffuser.

9. The apparatus of claim 1 wherein the apparatus is configured to deliver organic hydroperoxides as coatings over microbubbles that emanate from the microporous diffuser.

10. The apparatus of claim 1 wherein the apparatus is configured to deliver the air/ozone flow at an air flow rate of 3–5 CFM, an ozone flow rate of 144–430 gm/day, and an hydroperoxide flow rate of 5–50 gal/day.

11. The apparatus of claim 1 wherein the apparatus is configured to deliver a percent concentration of hydroperoxide in water in a range of 2–20 percent.

12. The apparatus of claim 1 wherein the hydroperoxide as a coating on the microbubbles serves to mitigate other competing reactions that can occur when chlorinated olefins double bonded carbon atoms are attacked by the ozone as chlorinated olefins enter the microbubbles.

13. An apparatus for treating subsurface water comprises:
an sparging apparatus that is disposed through a soil formation, the sparing apparatus comprising:
a microporous diffuser positioned through a bore hole disposed through the soil formation or is of a type that is injected into the soil formation;
a treatment control system comprising:
an air compressor that feeds a mixture of air/ozone into the microporous diffuser and
a feed mechanism to supply to the microporous diffuser a liquid decontamination agent comprising a hydroperoxide.

14. The sparging apparatus of claim 13 wherein the microporous diffuser is disposed through a vadose zone and an underlying aquifer in the soil formation.

15. The sparging apparatus of claim 13 wherein the microporous diffuser is coupled to appropriate piping to connect sources of decontamination agents to the microporous diffuser.

16. The sparging apparatus of claim 13 wherein the microporous diffuser has a first port that receives the air ozone mixture and a second port that receives the hydroperoxide, with the microporous diffuser producing microbubbles of air/zone and the hydroperoxide.

17. The apparatus of claim 16 wherein the microporous diffuser has a porosity characteristic that permits bubbles of 5–200 microns diameter to be released into the surrounding formation.

18. The apparatus of claim 13 wherein the apparatus is configured to deliver the hydroperoxide that is an intermediary products in reactions involving chlorinated olefins and ozone.

19. The apparatus of claim 13 wherein the apparatus is configured to deliver the hydroperoxide selected from the group consisting of formic peracid, hydrogen peroxide, hydroxymethyl hydroperoxide, 1-hydroxymethyl hydroperoxide, and chloroformic peracid.

20. The apparatus of claim 13 wherein the apparatus is configured to deliver the hydroperoxide as a coating on microbubbles, comprising air and ozone, the hydroperoxide serves to mitigate other competing reactions that can occur when chlorinated olefins double bonded carbon atoms are attacked by the ozone as chlorinated olefins enter the microbubbles.

21. The apparatus of claim 13 wherein the microporous diffuser has a porosity characteristic that permits bubbles in a range of 50 to 200 microns to be released into the surrounding formation.

22. The apparatus of claim 13 wherein the microporous diffuser has a porosity characteristic that permits bubbles in a range of 1 to 50 microns to be released into the surrounding formation.

23. The apparatus of claim 13 wherein the microporous diffuser has a porosity characteristic that permits bubbles in a range of 1 to 20 microns to be released into the surrounding formation.

24. The apparatus of claim 13 wherein the hydroperoxide is peroxide acid.

25. The apparatus of claim 13 wherein the microporous diffuser is a laminar microporous diffuser and the apparatus is configured to deliver the organic hydroperoxides to the laminar microporous diffuser, with the laminar microporous diffuser producing microbubbles with the hydroperoxide as a coating over the microbubbles.

26. The apparatus of claim 13 wherein the apparatus is configured to deliver the air/ozone at a air flow rate of 3–5 CFM, an ozone flow rate of 144–430 gms/day, and a hydroperoxide flow rate of 5–50 gal/day.

27. The apparatus of claim 13 wherein the apparatus is configured to deliver a percent concentration of hydroperoxide in water in a range of (2–20) percent.

* * * * *